Patented Apr. 12, 1949

2,467,358

UNITED STATES PATENT OFFICE 2,467,358

PREPARATION OF DIAZO PRINTS UTILIZING RESORCINOL CARBONAMIDES AS COUPLING COMPONENTS

Fred W. Neumann, Phillipsburg, N. J., assignor to General Aniline & Film Corporation, New York, N. Y., a corporation of Delaware No Drawing. Application June 15, 1946,
Serial No. 677,078

7 Claims. (Cl. 95—6)

1

The present invention relates to the preparation of dark toned diazo prints and more particularly to the utilization of a new class of coupling components more stable to pre-coupling than resorcinol and capable of yielding such prints with the usual diazos employed in the diazotype process.

As is known, the diazotype process involves treating a base such as paper, a cellulose ester or the like, with a sensitizing composition containing a light-sensitive diazo compound, exposing the treated base through a pattern, and subjecting the exposed material to development by means of an alkali, in the presence of an azo dye coupling component capable of reacting with the undestroyed diazo compound to produce azo dyestuff images. This process which is of rather general application in the formation of prints, generally resorts to coupling components which yield either prints of the nature of sepia or blue prints. The blue prints are generally made while utilizing as the coupling component a polyhydric naphthalene compound. However, for making prints of a brownish tone, resorcinol is generally employed as the coupling component. This is attributable to the speed at which the resorcinol couples, the tone of the images obtained therewith, and the solubility of resorcinol in aqueous solutions.

There is, however, a very material objection to the utilization of this coupler which has inspired a good deal of work in an effort to find a substitute free from such objection. The objection in question is the marked tendency of resorcinol to precouple prior to exposure and development, as a consequence of which the sensitized paper or foil develops a yellow background. Such action reduces the transparency of the background and impairs the prints, particularly if they are to be utilized for reproduction work.

I have now discovered that the disadvantages inherent in the utilization of resorcinol may be avoided by employing as the coupling component for diazotypes an amide of a resorcinol monocarboxylic acid. Such coupling components react with the usual diazos to yield azo dyestuff images of a very pleasing dark color having an improved fastness to washing. Unlike resorcinol, sensitized bases containing such couplers are stable against precoupling, thus insuring that the prints will be obtained on an uncolored background.

It is accordingly an object of the present invention to utilize for the preparation of images by

2 the diazotype process an amide of a resorcinol monocarboxylic acid as the coupling component.

Another object of the invention involves the preparation of maroon colored prints fast to washing on a light background while utilizing as the coupling component an amide of a resorcinol monocarboxylic acid.

A further object of this invention is a process for producing maroon images while utilizing as the coupling component for the diazotype process an amide of a resorcinol monocarboxylic acid.

Other and further important objects of the invention will become apparent as the description proceeds.

I have found that prints of the desired value can be secured while utilizing any amide of a resorcinol monocarboxylic acid. This group of compounds may be more precisely defined by the following general formula:

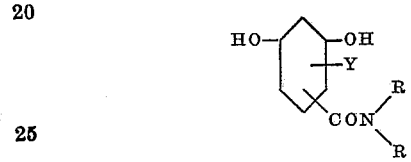

in which R is hydrogen, aliphatic, i. e., alkyl, such as methyl, ethyl, propyl, butyl, amyl and the like, hydroxyalkyl, such as beta-hydroxyethyl, gamma-hydroxypropyl and the like, aminoalkyl such as beta-aminoethyl, beta diethylaminoethyl, beta methylamino ethyl and the like, alkoxy alkyl such as methoxyethyl, ethoxyethyl, propoxyethyl and the like, araliphatic such as benzyl, alkoxy-benzyl, i. e., p-methoxybenzyl, o-ethoxybenzyl and the like, halogenobenzyl, i. e., p-chlorobenzyl, o-bromobenzyl and the like, alkyl benzyl such as p-methyl benzyl, p-ethyl benzyl, o-propylbenzyl and the like, and aromatic such as phenyl, naphthyl, p-chlorophenyl, tolyl, xylyl, p-methoxyphenyl and the like, and Y is hydrogen, alkyl as above, halogen such as bromine or chlorine, aminomethyl such as dimethyl aminomethyl, diethylaminomethyl, morpholinomethyl and the like.

Compounds embraced by the above formula may be prepared by amidating the various acetylated resorcinol monocarboxylic acids according to the usual practice, i. e., according to the method of Pascu (Ber., 54, 414 (1923)) and then hydrolyzing the acetylated resorcylamide, or by heating the alkyl ester of the resorcinol monocarboxylic acid with ammonia or a primary or secondary amine. Inasmuch as these processes are conventional in the art, and inasmuch as most of the compounds contemplated by the above formula are known, it is believed to be unnecessary to give further details with respect to the preparation of the same.

The resorcinol monocarboxylic acids which may be utilized for the preparation of the desired amides are: alpha- or 3.5-dihydroxybenzoic acid, beta- or 2.4-dihydroxybenzoic acid, gamma- or 2.6-dihydroxybenzoic acid, the acids being substituted in the nucleus when desired in the manner represented by the formula.

The class of resorcinol carbonamides the use of which as couplers is contemplated herein may be illustrated by the following specific compounds:

(1)
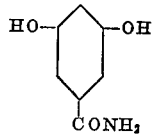
α-Resorcylamide (2)
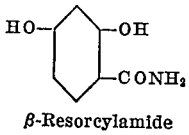
β-Resorcylamide (3)
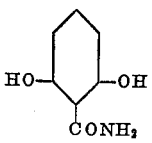
γ-Resorcylamide (4)
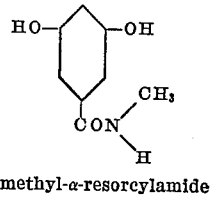
N-methyl-α-resorcylamide (5)
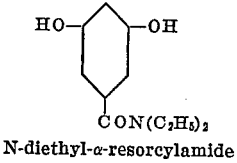
N-diethyl-α-resorcylamide (6)
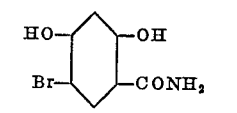
m-Bromo-β-resorcylamide (7)
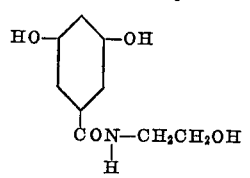
N-β-hydroxyethyl-α-resorcylamide (8)
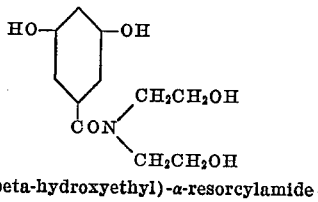
Di-(N-beta-hydroxyethyl)-α-resorcylamide (9)
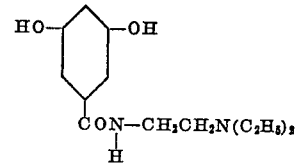
N-beta-diethylaminoethyl-α-resorcylamide

(10)
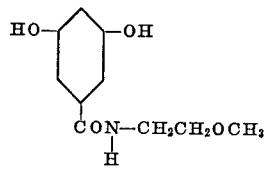
N-beta-methoxyethyl-α-resorcylamide

(11)
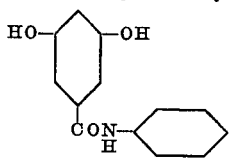
α-Resorcylanilide

(12)
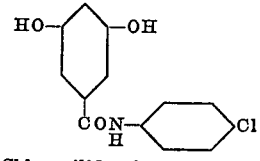
p-Chloranilide of α-resorcylic acid

(13)
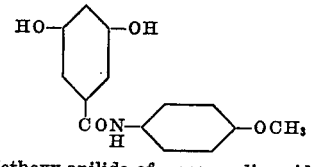
p-Methoxy-anilide of α-resorcylic acid

(14)
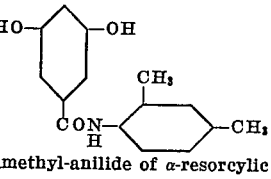
2.4-dimethyl-anilide of α-resorcylic acid

(15)
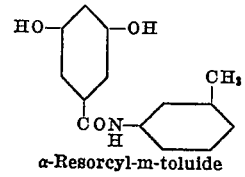
α-Resorcyl-m-toluide

(16)
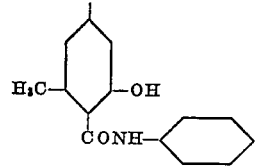
The anilide of 2.4-dihydroxy-6-methyl benzoic acid

(17)
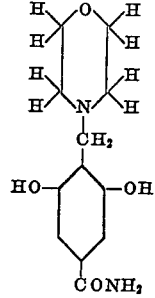
p-Morpholinomethyl-α-resorcylamide

The diazo component which is employed for the preparation of the dark-toned images along with the aforementioned amides may be any of those generally used in the diazotype art such as diazos derived from aminonaphthol sulfonic acids but preferably those of the type of p-phenylene diamines. The diazos may be utilized as such or in the form of their stabilized double salts such as with zinc chloride, cadmium chloride, tin chloride, boron fluoride and the like or in the form of their sulfates or sulfonates such as the alkyl or aryl sulfonates, i. e., methyl, ethyl, propyl, phenyl and the like sulfonates. Examples of suitable diazo compounds are:

Diazo diphenylamine sulfate
The diazonium compound of 4-amino-1-(N-ethyl-N-benzyl)-aminobenzene
The diazo of p-morpholinoaniline
The diazo of p-(N-methyl-N-beta-hydroxyethyl)-aniline
The diazo of 1-amino-2,5-dimethoxy-4-benzamidobenzene
The diazo of 1-amino-2-methyl-5-methoxy-4-benzamidobenzene
The diazo of p-amino-diethyl aniline
The diazo of p-aminodiphenylamine
4-(2',6' - dichlorbenzyl) - amino - 1 - benzenediazonium sulfate
The diazo of 1-amino-3-phenoxy-4-(2',6'-dichlorbenzyl) aminobenzene
The diazo of 1-amino-2-hydroxy-4-chlorbenzene-6-sulfonic acid
The zinc chloride double salt of 4-dimethylaminobenzene-1-diazonium chloride
The zinc chloride double salt of 4-monoethylamino-3-methylbenzene-1-diazonium chloride
The zinc chloride double salt of 4-dimethylamino-2-methyl benzene-1-diazonium chloride
The boron fluoride double salt of the diazo of 4-amino-1-mono-ethylamino-toluene
The sodium diazo sulfonate of 1-diethylamino-4-amino-3-ethoxybenzene
The sodium diazo sulfonate of 1-dimethylamino-3-methoxy-4-aminobenzene
The diazo of 1-(N-ethyl-N-propylamino)-3-ethoxy-4-aminobenzene
The diazo of 1 - (N - ethyl - N - butylamino)-3-methoxy-4-aminobenzene
The diazo of p-(N-ethyl-N-β-hydroxyethyl)-aniline
The diazo of 1-amino-4-benzylamino-2.5-diethoxybenzene
The cadmium chloride double salt of 4-diethylamino-1-diazobenzene The sensitizing compositions may contain the usual adjuncts such as metal salts to intensify the dyestuff image, i. e., aluminum sulfate, titanium ammonium fluoride, nickel sulfate, zinc chloride and the like, stabilizing agents such as thiourea, thiosinamine, naphthalene trisulfonic acid and the like, acids to retard precoupling such as citric acid, boric acid, tartaric acid and the like, hygroscopic agents such as glycol, glycerin, dextrin and the like, solvents such as isopropyl alcohol, ethylene glycol and the like, and wetting agents such as saponin and the like. The use of these various adjuncts in the relationships stated is well known in the art and further details with respect thereto are considered unnecessary.

The base to which the sensitizing compositions are applied may be in the form of a sheet, film or web of any of the usual film forming materials such as paper, cellulose esters such as cellulose acetate, cellulose propionate, cellulose acetate-propionate, linear superpolymers such as superpolyamides, superpolyesters and the like.

It is preferable in preparing the sensitized bases, to incorporate in the sensitizing compositions both the diazo component and the azo coupling component. The invention, however, may also be carried out while applying the coupler to the exposed material along with an alkali such as sodium carbonate during development. It is therefore to be understood that the invention is to be considered as having this broad scope.

The invention is further illustrated by the following examples, although it is to be understood that these are illustrative and not limitative.

Example I

Paper is coated with the following ingredients dissolved in 100 parts of water:

| | Parts |
|---|---|
| Double salt of zinc chloride and the diazo of 4-(N-methyl-N-beta-hydroxethylamino)-aniline | 2.52 |
| N-β-hydroxyethyl-α-resorcylamide | 2.96 |
| Ethylene glycol | 5 |
| Citric acid | 4 |
| Boric acid | 4 |
| Zinc chloride | 5 |
| Thiourea | 5 |
| Saponin | 0.5 |
| Isopropanol | 2 |

The paper after drying is found to be much more stable than that produced while using resorcinol as the coupler. Upon exposure through a pattern and development with moist ammonia fumes, a maroon dye print is obtained.

The coupler utilized above is prepared by heating a mixture of methyl-α-resorcylate and ethanolamine and has a melting point of 179.5 to 180.5° C.

Example II

Transparentized paper is coated with a solution containing 2.3 grams of α-resorcylamide (M. P. 282–283° C.) dissolved in 50 cc. of dimethylformamide. The paper so precoated is then further coated with a solution in 50 cc. of water of 2.52 grams of the double salt of zinc chloride and the diazo of 4-(N-methyl-N-β-hydroxyethylamino)-aniline

| | | |
|---|---|---|
| Isopropanol | cc | 2 |
| Ethylene glycol | cc | 5 |
| Citric acid | grams | 4 |
| Zinc chloride | do | 5 |
| Boric acid | do | 4 |
| Thiourea | do | 5 |
| Saponin | do | 0.5 |

The sensitized paper after drying is materially more stable than when produced with resorcinol as the coupler. Upon exposing the paper through a pattern and developing with ammonia vapor, maroon dye prints are obtained which have an improved wash fastness over those obtained when resorcinol is used as the coupler.

Example III

Paper is coated with a solution containing 1.72 grams of N-phenyl-α-resorcylamide (M. P. 215–217° C.) dissolved in 25 cc. of dimethyl formamide. The precoated paper is then further coated with the following ingredients dissolved in 50 cc. of water:

The double salt of zinc chloride and the diazo of 4-(N-methyl-N-β-hydroxyethylamino)-aniline

| | | |
|---|---|---|
| Isopropanol | cc | 2 |
| Ethylene glycol | cc | 5 |
| Citric acid | grams | 4 |
| Boric acid | do | 4 |
| Zinc chloride | do | 5 |
| Thiourea | do | 5 |
| Saponin | do | 0.5 |

The paper after drying is more stable than that produced when resorcinol is employed as the coupler. Upon exposure of the sensitized paper through a pattern and development with ammonia vapor, there are obtained maroon dye prints which have an improved wash fastness over those obtained when resorcinol is used as the coupler.

*Example IV*

Paper is coated with a solution containing 2.35 grams of mono-α-resorcylamide of ethylene diamine dissolved in 50 cc. of dimethyl formamide. After drying, the paper is further coated with the following ingredients dissolved in 50 cc. of water.

The double salt of zinc chloride and the diazo of 4-(N-methyl-N-β-hydroxyethylamino)-aniline

| | | |
|---|---|---|
| Isopropanol | cc | 2 |
| Ethylene glycol | cc | 5 |
| Citric acid | grams | 4 |
| Boric acid | do | 4 |
| Zinc chloride | do | 5 |
| Thiourea | do | 5 |
| Saponin | do | 0.5 |

Upon exposing the paper through a pattern and developing the same with ammonia vapor, maroon dye prints are obtained which have an improved wash fastness over those obtained when using other couplers such as resorcinol.

The coupler employed in this example is prepared by reacting methyl-α-resorcylate with an excess of ethylene diamine.

Various modifications of the invention will become apparent to persons skilled in the art and I therefore do not intend to be limited in the patent granted except as required by the appended claims.

I claim:

1. Light-sensitive diazotype material comprising a base carrying a light-sensitive diazo compound and as the azo component an amide of a resorcinol monocarboxylic acid.

2. Light-sensitive diazotype material comprising a base carrying a light-sensitive diazo compound and as the azo component a product of the following formula:

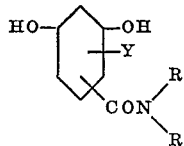

in which R is a member selected from the class consisting of hydrogen, aliphatic, araliphatic, and aromatic radicals and Y is a member selected from the class consisting of hydrogen, alkyl, halogen and amino alkyl.

3. The process of producing diazotype prints which comprises sensitizing a base with a composition containing a light-sensitive diazo compound, exposing the base through a pattern and developing the exposed material with an alkali in the presence of an amide of a resorcinol monocarboxylic acid.

4. The process as defined in claim 3 wherein the amide has the following formula:

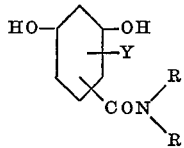

in which R is a member selected from the class consisting of hydrogen, aliphatic, araliphatic and aromatic radicals and Y is a member selected from the class consisting of hydrogen, alkyl, halogen and aminoalkyl.

5. Light-sensitive diazotype material comprising a base carrying a light-sensitive diazo component and as the coupling component N-(β-hydroxyethyl)-α-resorcylamide.

6. Light-sensitive diazotype material comprising a base carrying a light-sensitive diazo component and as the coupling component α-resorcylamide.

7. Light-sensitive diazotype material comprising a base carrying a light-sensitive diazotype component and as the coupling component N-phenyl-α-resorcylamide.

FRED W. NEUMANN.

REFERENCES CITED

The following references are of record in the file of this patent:

UNITED STATES PATENTS

| Number | Name | Date |
|---|---|---|
| 2,405,523 | Sease | Aug. 6, 1946 |